United States Patent [19]

Merrill, Jr. et al.

[11] 3,855,336

[45] *Dec. 17, 1974

[54] PROCESS FOR THE PRODUCTION OF SYNTHESIS GAS, CRACKED HYDROCARBON AND CALCINED COAL

[75] Inventors: La Vaun S. Merrill, Jr., Englewood; Robert E. Schilson, Littleton, both of Ohio

[73] Assignee: Marathon Oil Company, Findlay, Ohio

[ * ] Notice: The portion of the term of this patent subsequent to July 11, 1989, has been disclaimed.

[22] Filed: Aug. 23, 1973

[21] Appl. No.: 391,000

Related U.S. Application Data

[63] Continuation-in-part of Ser. No. 265,915, June 23, 1972, abandoned, which is a continuation-in-part of Ser. No. 857,517, Sept. 12, 1969, Pat. No. 3,676,517.

[52] U.S. Cl. ......... 260/679 R, 260/683 R, 252/373, 48/204
[51] Int. Cl. ............................................. C07c 11/24
[58] Field of Search..... 260/679 R, 683 R; 252/373; 48/204, 206

[56] References Cited
UNITED STATES PATENTS

| | | | |
|---|---|---|---|
| 3,676,517 | 7/1972 | Merrill et al. | 260/679 |
| 1,968,053 | 7/1934 | Odell | 201/36 |
| 3,061,524 | 10/1962 | Savage | 201/29 |
| 1,883,744 | 10/1932 | Beardsley | 208/128 |
| 1,865,195 | 6/1932 | Lewis | 208/128 |
| 2,526,696 | 10/1950 | Schutte | 260/679 |
| 3,522,170 | 7/1970 | Moser, Jr. | 201/36 |
| 1,875,253 | 8/1932 | Minotte | 252/372 |
| 3,440,177 | 3/1969 | Patton et al. | 252/373 |
| 1,762,100 | 6/1930 | Odell | 48/196 |
| 1,841,201 | 1/1932 | Odell | 48/196 |
| 2,721,227 | 10/1955 | Mungen | 260/679 |
| 405,911 | 6/1889 | Rennyson | 49/119 |
| 277,270 | 5/1883 | Gross | 48/119 |

*Primary Examiner*—Delbert E. Gantz
*Assistant Examiner*—Juanita M. Nelson
*Attorney, Agent, or Firm*—Joseph C. Herring; Richard C. Wilson, Jr.; Jack L. Hummel

[57] ABSTRACT

Synthesis gases, cracked hydrocarbons, and calcined coal are produced in a calciner. Hot combustion gases are first produced by oxidizing volatile matter from coal, then at least a portion of the combustion gases plus hydrocarbon(s) and/or steam are passed into the soaking pit of the calciner and product gases are recovered.

19 Claims, 4 Drawing Figures

PROCESS FOR THE PRODUCTION OF SYNTHESIS GAS, CRACKED HYDROCARBON AND CALCINED COAL

CROSS REFERENCE TO RELATED APPLICATIONS

This application is a continuation-in-part of my co-pending patent application, Ser. No. 265,915, filed June 23, 1972, now abandoned which is a continuation-in-part of application Ser. No. 857,517, filed Sept. 12, 1969, now U.S. Pat. No. 3,676,517.

BACKGROUND OF THE INVENTION

1. Field of the Invention

This invention relates to an improved calcining process. At least a portion of the combustion gases from the calcining step are collected and passed through heated coal, the coal being at a temperature of about 1500°–2500°F. Hydrocarbons and/or steam are injected along with the combustion gases and cracked hydrocarbon(s) and/or synthesis gas is recovered.

2. Description of the Prior Art

U.S. Pat. No. 1,968,053 to Odell teaches increasing the gas synthesizing capacity of a coal carbonizing unit by causing reactions to occur between steam and hydrocarbon prior reactions to occur between steam and hydrocarbon prior to and simultaneously with the cooling of the carbonized product, which is usually coke. Odell passes his combustion gases out into the atmosphere and does not recycle them back to the soaking area of the calcination process.

U.S. Pat. No. 2,707,148 to Kollgaard teaches burning coal, then passing steam over the hot coal to produce water-gas and to purge the system and thereafter hydrocarbon is passed counter-currently through the coal to crack the hydrocarbon.

U.S. Pat. No. 3,061,524 to Savage teaches a flash carbonization process for the production of a low volatile char and synthesis gas with low tar formation. Such is accomplished by oxidizing coke in the presence of steam at temperatures in excess of 1200°F. and at pressures under 1000 psig to convert a substantial portion of the coke to a low volatile char. Synthesis gases are recovered without substantial tar formation.

SUMMARY OF THE INVENTION

Coal is calcined at temperatures averaging about 2000° to 2,500°F. Heat generated in the calciner and especially the heat content of the hot calcined coal is used to produce synthesis gases and cracked hydrocarbons in addition to calcined coal. Combustion gases, usually containing $CO$, $CO_2$, $H_2O$, $N_2$, $Ar$, etc. plus any unburned volatile matter, are passed (e.g., drawn) through the soaking pit along with steam and/or added hydrocarbons, the steam and added hydrocarbons being introduced into the calciner below the combustion zone. Synthesis gases and/or cracked hydrocarbons are withdrawn at the bottom of the soaking pit, e.g., at temperatures of about 1000°–1600°F. Calcined coal is recovered from the calciner.

Figure 1:
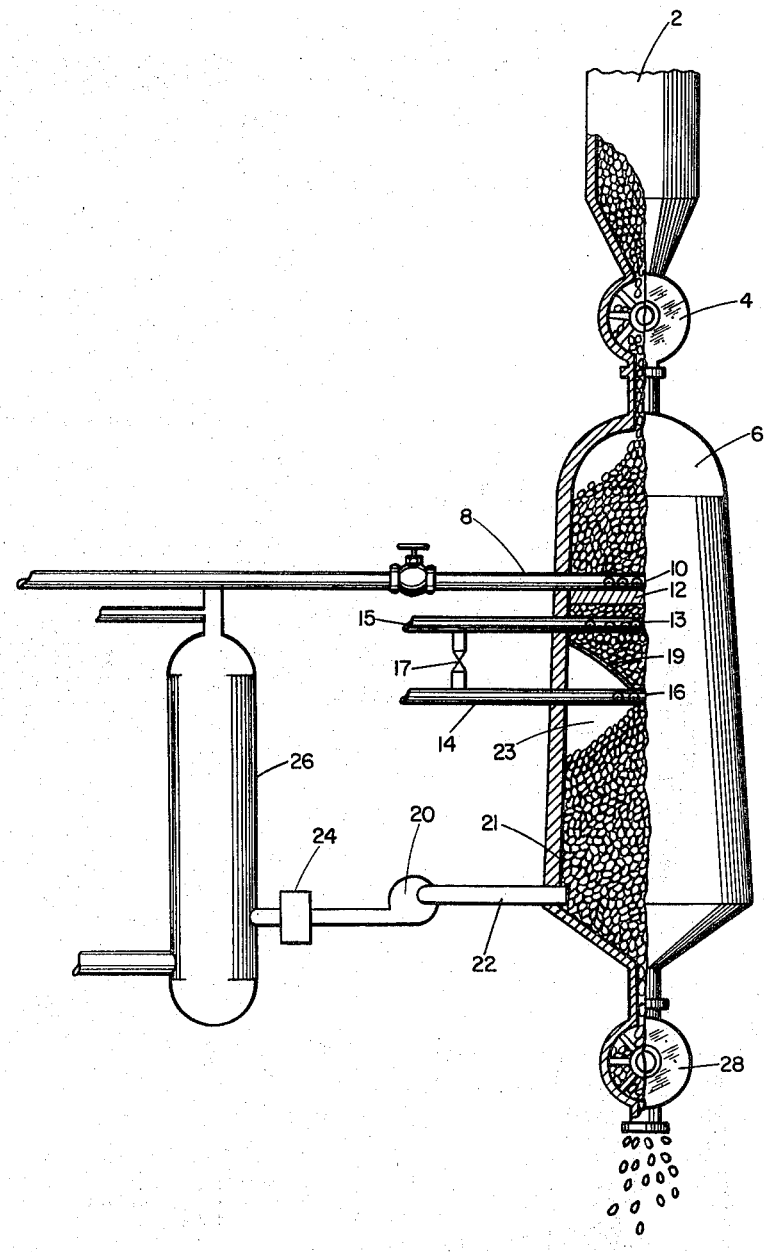
FIG. 1 is a front elevation of a retort calciner. The calciner is partially broken to show internal equipment and material movement.

Coal is fed from hopper 2 through valve 4, shown as a star feeder, into retort 6. Valve 4 prevents any substantial pressure leak. Retort 6 is bell-shaped and terminates in a conical bottom portion. The coal piles and moves downwardly through the retort by gravity flow. An oxidant is introduced through pipe 8 and is distributed throughout the width of the coal via header 10. Coal passes into combustion zone 12, indicated by diagonal shading just below header 10. Nearly all of the available oxidant is consumed in combustion zone 12, or flame front, thereby limiting the zone depth, e.g., to a few inches. Combustion is substantially controlled by the amounts of coal and oxygen-containing gas injected. It is here that calcination takes place. Calcination time is controlled by varying retort depth, rates of coal and oxidant input, etc.

Combustion gases or a portion thereof are withdrawn through header 13 and conduit 15. At least a portion of the withdrawn combustion gases are re-introduced into the retort via conduit 14 and header 16, header 16 being underneath circular baffle 19. Hydrocarbons and/or steam are introduced along with the combustion gases through conduit 14. Circular baffle 19 separates the calcining zone from the zone where synthesis gases are produced. Production of synthesis gas and cracked hydrocarbons takes place in the hot calcined coal bed below circular baffle 19.

Synthesis gases and/or cracked hydrocarbons are withdrawn through conduit 22. Calcined coal leaves the retort through valve 28.

Flange 21 prevents solids from entering pipe 22. Vapor pump 20 draws the gaseous products through conduit 22 and heat exchanger 24 cools the product before entering condenser 26. Vapor pump 20 creates a downward draft in the calciner to draw combustion gases through the hot coal. Insulation in retort 6 prevents substantial heat loss.

Figure 2:
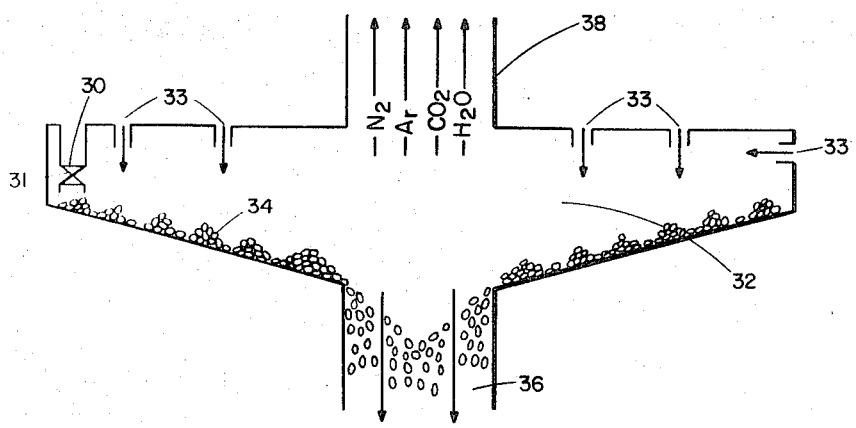

FIG. 2 is a simplified horizontal schematic of a rotary hearth calciner showing feed chute 30 and valve 31 through which coal is fed. Oxidant is introduced at points 33 and calcination takes place in bed 34. Calcined coal is discharged from soaling pit 36. Combustion gases, e.g., $N_2$, $Ar$, $CO_2$, $H_2O$, unburned volatiles, etc. are removed at the top of the calciner through stack 38.

Figure 3:
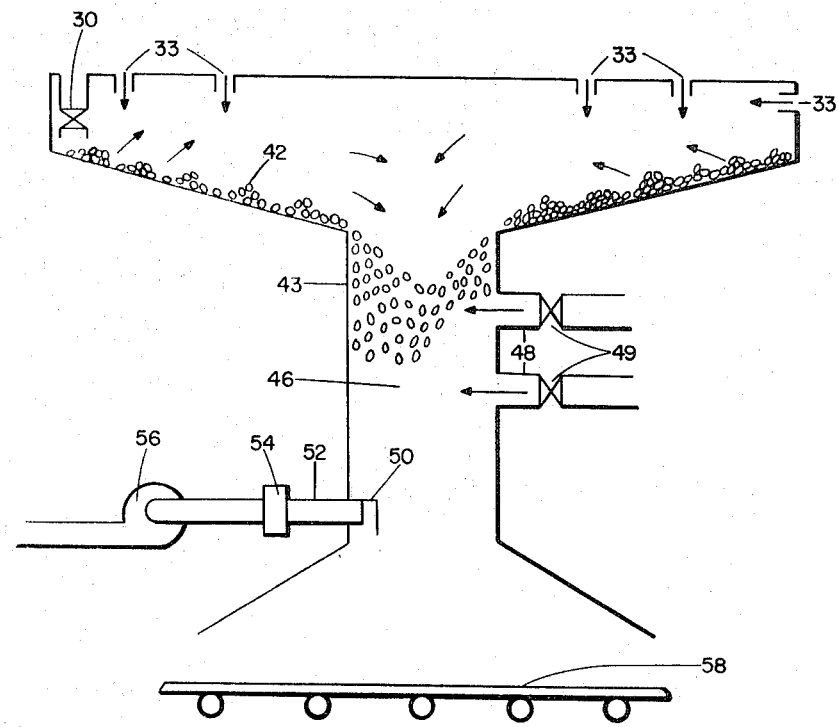

FIG. 3 shows how the rotary hearth calciner can be modified to accommodate the invention. Stack 38 has been closed off. Coal enters the calciner through feed chute 30 and valve 31 and is calcined in coal bed 42 on the rotating hearth. Combustion gases and unburned volatile matter, including $N_2$, $Ar$, $CO_2$, and $H_2$), are drawn through coal bed 43. Soaking pit 46 is lengthened to permit the cracking of hydrocarbons. Hydrocarbons and/or steam is introduced through valves 49 and input pipes 48. Product gases, e.g., $CH_4$, $C_2H_2$, $H_2$, $CO$, etc. are withdrawn through conduit 52 and heat exchanger 54 via vapor pump 56. Flange 50 prevents solids from entering conduit 52. Calcined coal falls on conveyer belt 58.

Figure 4:
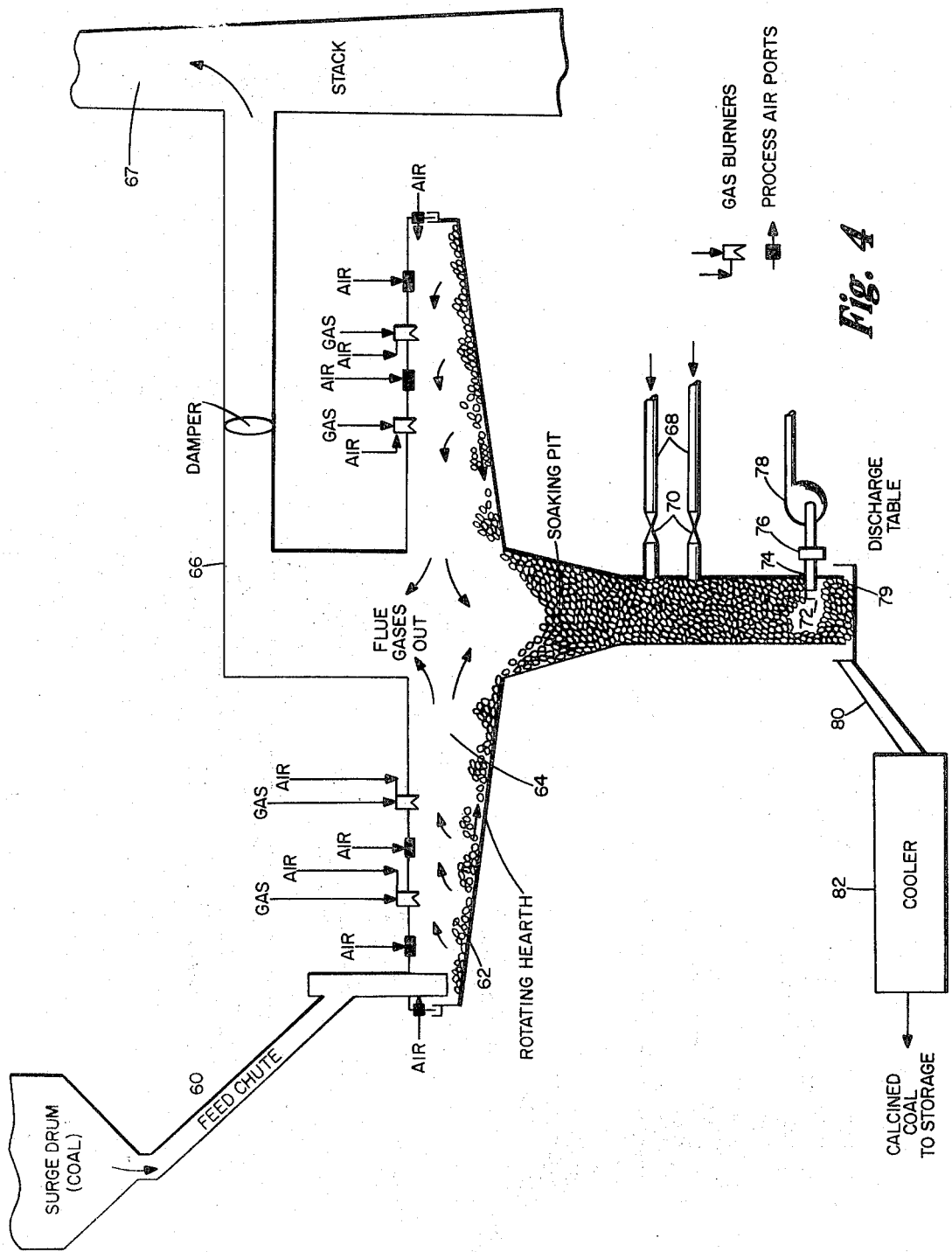

FIG. 4 represents another view of a rotary hearth calciner. Coal enters the rotating hearth through chute 60. Air and/or gas and air (the gas to supply supplemental heat to the calciner) are introduced to oxidize part or all of the volatiles from the coal and provide heat for calcining. The coal is calcined on the rotating hearth at 62, the arrows indicate combustion gases evolving from the coal. Combustion gases, without the damper in conduit 66, tend to pass into conduit 66 and then to stack 67 and the atmosphere. However, the damper in conduit 66 is closed or partially closed to prevent this from happening. In the soaking pit, hydrocarbons other than those in the unburned volatile matter and/or steam are introduced through conduits 68 and valves 70 to come in contact with the hot calcined coal and some fraction of the combustion gases being passed through the soaking pit. Vapor pump 78 facilitates moving the combustion gases and hydrocarbon and/or steam through the soaking pit and it also draws the synthesized gases and/or cracked hydrocarbon through conduit 74 and heat exchanger 76. Baffle 72 prevents the calcined coal from entering conduit 74. The calcined coal is discharged on table 79 and thereafter enters cooler 82 through conduit 80. Thereafter, the calcined coal is sent to storage. Heat as well as the degree of calcining can be controlled by the amount of air and/or air and gas introduced into the rotating hearth above the coal bed.

DESCRIPTION OF THE PREFERRED EMBODIMENTS

The process of this invention is useful for calcining low, medium, and high volatile coal. Low volatile coal is defined as containing up to about 25 percent by weight of volatiles. Medium volatile coal may contain about 25 to about 31 percent by weight of volatiles. High volatile coal contains more than about 31 percent by weight of volatiles. Examples of these coals can be found in Chemical Engineers' Handbook, 3rd Edition, J. H. Perry, pp. 1560–1568.

Any type of calcining unit, including the rotary hearth calciner, the shaft (retort) calciner, or the electric calciner, may conveniently be modified to effect the invention. The retort calciner can be modified by designing the retort with means for removing at least a major portion of the combustion gases. An input pipe is installed at some point below the flame front of the calciner and below the point at which the combustion gases are withdrawn so that steam and/or hydrocarbon can be injected into the soaking area of the retort. Synthesis gases and/or cracked hydrocarbon are withdrawn near the bottom of the retort.

In the rotary hearth calciner, the exhaust stacks can be closed off or partially closed off. The soaking pit can be lengthened to facilitate the flow of combustion gases and unburned volatile matter through the hot coal; and, steam and/or additional hydrocarbon can be piped into the soaking pit at points determined by the kind and quality of the products desired.

The oxidant used with the invention is preferably air, oxygen, or mixtures of oxygen and inert gases. The oxidant can be preheated to any desired temperature prior to use.

The amount of oxidant required in any particular instance will depend on the type of oxidant used, the coal to be calcined, the desired combustion zone temperature, the desired product gases, and the desired volatile combustible matter content of the coal. This amount can be determined through routine methods.

Generally, the oxidant introduced into the calciner will be that amount required to maintain the calciner at the desired temperature. The volatiles oxidized and the coal burned are preferably about 2 to about 25 percent by weight of the coal, these two oxidation steps are broadly defined as oxidizing coal.

The coal and oxidant input should be regulated to attain a temperature within the range of about 2000° to about 2500°F., and preferably about 2200° to about 2500°F.

In the retort calciner, the highest temperatures are obtained at the forward face of the combustion zone where most of the oxygen is consumed. There is a continuing slow temperature drop as the material moves away from this combustion front. For example, temperatures can range from about 2500°F. in the calciner to about 1000°F. in the area where calcined coal is discharged and more preferably from about 2450° to about 1600°F.

Temperatures within the soaking pit are preferably about 1500° to about 2500°F. and more preferably about 1800° to about 2200°F. Of course, the desired temperature within the soaking pit will depend upon the hydrocarbon to be introduced into the soaking pit for cracking purposes, and also upon the desired cracked hydrocarbons or synthesis gases. For example, if a naphtha (e.g., having a boiling point within the range of about 150° to about 375°F.) is introduced as the hydrocarbon and if acetylene is the desired cracked hydrocarbon, the desired temperature of the soaking pit is about 1900° to about 2550°F. However, if ethylene is desired, using the same naphtha, the temperature of the soaking pit is preferably about 1450° to about 2100°F.

The residence time of the steam and/or hydrocarbon introduced into the soaking pit is generally less than about 1 second and preferably, less than 0.001 second. Of course, the residence time is also dependent upon the desired product, the hydrocarbon to be introduced into the soaking pit and the temperature of the soaking pit.

The hydrocarbon to be introduced into the soaking pit can be liquid or gas. The type, state and concentration of the hydrocarbon as well as the injection rate, will depend upon many factors, including the desired products. Examples of useful hydrocarbons to be introduced into the soaking pit include paraffinic hydrocarbons such as methane, ethane, propane, butane, pentane, hexane, naphthas having boiling points within the range of about 80° to about 500°F. and preferably light naphtha (boiling point range about 100° to about 350°F.) or heavy naphtha (boiling point range about 200° to about 450°F.) Some hydrocarbons have a negative heat of reaction which means that at high temperatures the desired product may be obtained with a comparatively small amount of heat absorbed from the calcined coal. Benzene and ethylene are examples of such hydrocarbons. Other hydrocarbons such as methane, ethane, propane, butane, pentane, and hexane have positive heats of reaction and require large amounts of heat from the calcined coal in order to be effectively cracked.

Facts and figures relating to the combustion of hydrocarbons are plentiful. See, for example, *Petroleum Refinery Engineering*, 3rd Ed., 1949, McGraw-Hill, W. L. Nelson, Chapter V, "Combustion", pp. 358–375, and *Chemical Engineering Handbook*, 3rd Ed., 1950, McGraw-Hill, John H. Perry, "Gaseous Fuels", pp. 1575–1589.

Steam may be introduced into the calciner separately or simultaneously with the hydrocarbon. It can be superheated prior to injection. Inasmuch as coal will have a certain moisture content, the amount and rate of steam injected will determine the extent of the water-gas reaction. The water-gas reaction serves to reform combustion gases within the calciner. This reaction can be calculated by known means to produce synthesis gases possessing specific characteristics. For background information see *Industrial Chemicals*, Faith, Keyes, and Clark, 2nd Ed. (1961), John Wiley & Sons, pp. 440–444; and *Chemical Process Industries*, Shreve, McGraw-Hill (1956), pp. 88–89.

The product gases from the calciner include synthesis gases and/or cracked hydrocarbons. Examples of desired product gases include methane, ethane, ethylene, acetylene, carbon monoxide, hydrogen, propylene, etc.

The residence time can be controlled by controlling the rate of hydrocarbon(s) and/or steam injected and the design of the reaction zone (also identified as soaking pit). The energy required to crack the hydrocarbons will depend upon the temperature of the coal entering the soaking pit, the heat induced into the rotating hearth due to gas burners such as illustrated in FIG. 4, and any other means of inducing heat into the rotating hearth and the soaking pit.

The following examples further explain the invention. These examples as well as the figures are not intended to limit the invention in any way. Rather, all equivalents obvious to those skilled in the art are meant to be included within the scope of the invention as defined in the specification and appended claims.

EXAMPLE I 25 lbs. per square foot of hearth area per hour ($lbs/ft^2/hr$) of low volatile coal containing 10 percent moisture and 10 percent volatile content (dry basis) is fed into a modified rotary hearth calciner where the temperature near the top of the soaking pit is about 2500°F. 20.25 $lbs/ft^2/hr$ of calcined coal are discharged at a temperature of about 1600°F. No steam or hydrocarbons are added. Based on stoichiometric air to volatile ratios, $lbs/ft^2/hr$ of gases are shown in Table 1:

TABLE 1

| Gases | Gases entering Soaking Pit at 2500°F. | Product gases from Soaking Pit at 1600°F |
|---|---|---|
| | $lbs/ft^2$ of hearth area/hr | $lbs/ft^2$ of hearth area/hr |
| $N_2$ | 35.13 | 35.13 |
| Ar | 0.60 | 0.60 |
| $CO_2$ | 4.95 | 0 |
| $H_2O$ | 8.10 | 4.05 |
| CO | 0 | 12.60 |
| $H_2$ | 0 | 0.45 |

EXAMPLE II

Under the conditions of Example I, $CH_4$ is introduced near the top of the soaking pit. Table 2 indicates the products of the reaction.

TABLE 2

| Product | Soaking Pit Entrance $lbs/ft^2$ of hearth area/hr | Soaking Pit Outlets $lbs/ft^2$ of hearth area/hr |
|---|---|---|
| Coal | 25 | 20.25 |
| $N_2$ | 35.13 | 35.13 |
| Ar | 0.60 | 0.60 |
| $CO_2$ | 4.95 | 1.29 |
| $H_2O$ | 8.10 | 4.86 |
| $CH_4$ | 5.00 | 1.25 |

TABLE 2-Continued

| Product | Soaking Pit Entrance $lbs/ft^2$ of hearth area/hr | Soaking Pit Outlets $lbs/ft^2$ of hearth area/hr |
|---|---|---|
| CO | ≈ 2.4 | 9.70 |
| $H_2$ | 0 | 1.30 |

EXAMPLE III

About 6.0 $lbs/ft^2/hr$ of n-hexane at 100°F. is introduced into the process of Example I at a point above the 1600°F. outlet and is cracked. The product gas removed at 1000°F. contains methane, ethane, ethylene, etc.

EXAMPLE IV

20 $lbs/ft^2/hr$ of high volatile coal containing 10 percent moisture content and 35 percent volatile content (dry basis) is fed into the calciner of Example I under similar reaction conditions. 15.2 $lbs/ft^2/hr$ of calcined coal are discharged at a temperature of about 1600°F. No steam or hydrocarbons are added. Table 3 indicates the products of the reaction.

TABLE 3

| Product | Soaking Pit Entrance $lbs/ft^2$ of hearth area/hr | Soaking Pit Outlets $lbs/ft^2$ of hearth area/hr |
|---|---|---|
| Calcined coal | 17.1 | 15.2 |
| $N_2$ | 35.13 | 35.13 |
| Ar | 0.60 | 0.60 |
| $CO_2$ | 4.95 | 1.29 |
| $H_2O$ | 8.10 | 4.86 |
| $CH_4$ | 1.70 | 0.43 |
| CO | ≈ 2.4 | 9.70 |
| $H_2$ | .52 | 1.39 |
| Unburned volatiles* | 1.43 | 0 |

*The unburned volatiles would crack to methane, ethane, ethylene, etc.

EXAMPLE V

About 3 $lbs/ft^2/hr$ of naphtha at 400°F. is introduced into the process of Example IV. The product gas contains methane, ethane, ethylene, propane, propylene, etc.

What is claimed is:

1. In a calcination process comprising passing coal through a combustion zone in the presence of an oxidant wherein about 2 to about 25 weight percent of the coal is permitted to oxidize, thereby heating the remaining coal to an average temperature within the range of about 2000°F. to about 2500°F. and producing combustion gases comprising $N_2$, Ar, $CO_2$, $H_2O$ and CO, and then passing the heated coal through a calcination zone to obtain calcined coal, the step comprising passing at least a portion of the combustion gases through the heated coal and simultaneously introducing steam, hydrocarbon, or steam and hydrocarbon into the heated coal at a temperature sufficient to obtain cracking of the hydrocarbon and removing the resulting synthesis gases, cracked hydrocarbons, and the calcined coal.

2. The process of claim 1 wherein the coal is a low volatile coal.

3. The process of claim 1 wherein the coal is a medium volatile coal.

4. The process of claim 1 wherein the coal is a high volatile coal.

5. The process of claim 1 wherein the calciner is a retort calciner.

6. The process of claim 1 wherein the calciner is a rotary hearth calciner.

7. The process of claim 1 wherein the coal is heated to a temperature of about 2200° to about 2500°F.

8. The process of claim 1 wherein the combustion gases contain unburned volatile matter.

9. The process of claim 1 wherein the product gases and calcined coal are withdrawn from the calciner at a temperature within the range of from about 1000°F. to about 1600°F.

10. The process of claim 1 wherein the hydrocarbon is a light naphtha.

11. The process of claim 1 wherein the hydrocarbon is a heavy naphtha.

12. The process of claim 1 wherein the cracked hydrocarbons comprise ethylene.

13. The process of claim 1 wherein the cracked hydrocarbons comprise acetylene.

14. In a calcination process comprising passing coal through a combustion zone in the presence of an oxidant wherein about 2 to about 25 weight percent of the coal is permitted to oxidize, thereby heating the remaining coal to an average temperature within the range of about 2000° to about 2500°F. and producing combustion gases comprising $N_2$, Ar, $CO_2$, $H_2O$, and CO, and then passing the heated coal through a calcination zone to obtain calcined coal, the step comprising passing at least a portion of the combustion gases through the calcined coal and simultaneously introducing steam, hydrocarbon, or steam and hydrocarbon into the calcined coal at a temperature sufficient to obtain cracking of the hydrocarbon and removing the resulting syntheses gases, cracked hydrocarbons and the calcined coal.

15. The process of claim 14 wherein the hydrocarbon is a light naphtha.

16. The process of claim 14 wherein the coal is a low volatile coal.

17. The process of claim 14 wherein the coal is a medium volatile coal.

18. The process of claim 14 wherein the coal is a high volatile coal.

19. The process of claim 14 wherein the combustion gases contain unburned volatile matter.

* * * * *